(12) United States Patent
Imazaike

(10) Patent No.: US 6,402,158 B1
(45) Date of Patent: Jun. 11, 2002

(54) SEAL DISK FOR BEARINGS

(75) Inventor: Toshiyuki Imazaike, Osaka-fu (JP)

(73) Assignee: Nichia Precision Industry Co., Ltd., Osaka (JP)

( * ) Notice: Subject to any disclaimer, the term of this patent is extended or adjusted under 35 U.S.C. 154(b) by 0 days.

(21) Appl. No.: 09/216,981

(22) Filed: Dec. 21, 1998

(30) Foreign Application Priority Data

Jan. 13, 1998 (JP) .......................................... 10-004893
Jan. 22, 1998 (JP) .......................................... 10-010580

(51) Int. Cl.[7] .............................................. F16J 15/32
(52) U.S. Cl. ...................................... 277/549; 277/586
(58) Field of Search ................................ 277/549, 586, 277/587, 551, 572; 384/138, 140, 147, 148, 484, 487

(56) References Cited

U.S. PATENT DOCUMENTS

| | | | |
|---|---|---|---|
| 4,505,484 A | * | 3/1985 | Ohkuma et al. |
| 5,133,609 A | * | 7/1992 | Ishiguro ..................... 384/486 |
| 5,333,957 A | * | 8/1994 | Yip et al. .................... 384/484 |
| 5,383,728 A | * | 1/1995 | Micca et al. ............ 384/484 X |
| 5,433,533 A | | 7/1995 | Imazaike ..................... 384/488 |
| 5,470,158 A | * | 11/1995 | McLarty et al. ............. 384/484 |
| 5,607,240 A | * | 3/1997 | Kajihara et al. ......... 384/484 X |
| 5,860,748 A | * | 1/1999 | Okumura et al. ............ 384/486 |

* cited by examiner

Primary Examiner—Robert J. Sandy
Assistant Examiner—Karlena Schwing
(74) Attorney, Agent, or Firm—Griffin & Szipl, P.C.

(57) ABSTRACT

A non-contact plastic or rubber seal disk for bearings with improved sealing performance, which can be thrust into the seal groove of the outer ring concentrically with the bearing, with the bearing axis as center, without difficulty and so tightly as to prevent enclosed lubricant from leaking out, with no undesirable force working on the seal disk in service. The seal disk has a peripheral portion to be caught in a ring-shaped seal groove with a U-shaped section, with the peripheral portion of the seal disk in elastic contact with the inner inside wall and the outer inside wall of the groove. The seal groove is formed inside each outer ring, that is, at each end portion of the inside wall of the outer ring of the bearing and comprises an inner inside wall perpendicular to the axis of the bearing, a bottom wall, and an open-out-formed outer inside wall. The seal disk is so configured as to provide a very narrow gap between the bore wall of the seal disk and the inner ring of the bearing. The seal disk is provided with, on the face of the peripheral portion thereof, a ring-shaped thin projection that comes into contact, in a bent form, with the outer inside wall of the seal groove.

9 Claims, 18 Drawing Sheets

SEAL DISK FOR BEARINGS

FIELD OF THE INVENTION

This invention relates to plastic or rubber seal disks for seal-type bearings, in particular bearings with seal grooves formed inside each of two shoulders of an outer ring. More specifically, this invention relates to an improved seal disk for bearings that can be fitted into the seal groove concentrically with the bearing and having the bearing axis as center. The seal disk of the present invention prevents enclosed lubricant from leaking out almost infallibly, even when the seal disk expands or shrinks under thermal stress and/or absorbs water or other liquids and swells.

BACKGROUND OF THE INVENTION

Seal-type bearings with lubricant enclosed therein are widely used in such fields as office equipment and household electric appliances. In bearings of this type, plastic and rubber seal disks are widely used because they provide high sealing performance and easy fitting. Examined Japanese utility model application No. 7-32985 discloses one widely known embodiment thereof.

The seal disk disclosed in Japanese utility model 7-32985 is illustrated in FIG. 19. As shown, the seal disk is integrally formed and has a ring-shaped raised area 6a with a trapezoid-like section on the back side in the outer circumferential portion and a projection 6b with a triangular section on the face in the outer circumferential portion. Seal disk 6 is placed around an inside edge of the face of outer ring 7 and pressed uniformly into the U-shaped groove formed inside each shoulder of outer ring 7, as shown in FIG. 20. Seal disk 6 is caught in groove 7', with the inside flat top surface of ring-shaped raised area 6a in contact with the inner inside wall of seal groove 7' and projection 6b bent on the outer inside wall of seal groove 7'.

Thus seal disk 6 is held in seal groove 7' tightly and firmly by the elastic force of projection 6b, with the gap between the outer ring and the inner ring securely sealed. That is, seal disk 6 has the outer peripheral portion in contact with inner inside wall 7a of seal groove 7' and elastically with outer inside wall 7b of seal wall 7', with a minute gap G defined between the bore edge of seal disk 6 and the inner ring. This prevents lubricant enclosed between outer and inner rings 7 and 8 from leaking out and keeps dust and other foreign matter from entering the space between the two rings.

In FIG. 20, reference numeral 9 indicates one of a plurality of free-rolling balls placed between outer and inner rings 7 and 8, while reference numeral 10 is a retainer or separator, keeping balls 9 apart from one another at regular intervals. The bearing in which plastic or rubber seal disk 6 is used has the outer inside wall 7b of seal groove 7' designed so as to define an angle of inclination a of about 45 degrees with the face of outer ring 7, as indicated in FIG. 21.

With the outer peripheral portion of seal disk 6 held in seal groove 7' of outer ring 7, projection 6b is bent toward the center of seal disk 6, with an elastic reaction force N working in a direction indicated by the arrow, shown in FIG. 21. A component of this reaction force N works in the direction of the center of seal disk 6 from the circumference thereof. In FIG. 21, the angle of inclination α of outer inside wall 7b of the seal groove 7' is large, and so is the component force working from the outer peripheral portion of seal disk 6 toward the bore or the center thereof. As a result, seal disk 6 when installed is automatically concentric with the bearing and has the axis of the bearing as a center. Gap G between the bore wall of seal disk 6 and inner ring 8 is maintained approximately uniform all around.

However, bearings with smaller angles of inclination α will have smaller component forces working from an outer peripheral portion of seal disk 6 to the bore. When a conventional plastic or rubber seal disk 6 is placed in such a bearing, the elastic reaction force N will work more along the direction of the axis of the bearing, because of the smaller angle of inclination α, as illustrated in FIG. 22.

In bearings with small angles of inclination α of the outer inside wall 7b of seal groove 7', the seal disk 6 can fail to be mounted concentrically with the bearing and have the axis as center. That is, a seal disk 6 may be installed eccentrically, with non-uniformity caused in the gap G between the seal disk 6 and the inner ring 8. That can cause such problems as decreased sealing performance, dismounting of seal disk 6 off seal groove 7', and deterioration in the roundness of outer ring 7.

These problems are especially evident with bearings in which a metallic seal disk or a metal-plastic combination seal disk is used. The seal grooves 7' in such bearings are designed so that the angle of inclination α is less than approximately 17 degrees. In such bearings, a plastic or rubber seal cannot be used in place of metallic or metal-plastic combination seal disks, even though plastic and rubber seal disks are less expensive but excellent in durability.

Another problem relates to the lubricant that is normally enclosed within seal disk 6 of the bearing. Rotation of the bearing generates a centrifugal force that forces the lubricant outward. Leakage of the lubricant is blocked primarily by seal disk 6 with its raised area 6a in close contact with the inner inside wall 7a of seal groove 7'. Contact seal performance at this point is a function of the contact pressure, the closeness of the contact, and the size of the contact area. Increasing the contact pressure and the size of the contact area can improve seal performance and minimize the possibility of lubricant leakage. However, there is a certain limit to the magnitude of the elastic reaction force that can be mounted in practice on a raised area 6a, because of such factors as the mechanical strength of the seal disk and the inside edge of the outer ring face as well as the resistance force to be overcome in mounting a seal disk 6. Also, a certain limit is imposed on the size I of the contact area between inner inside wall 7a of seal groove 7' and raised area 6a, because of the thickness of the bearing outer ring 7, the shape of the seal groove 7', and other considerations. Thus the size I of the contact area may not be expanded very much.

For those reasons, seal-type bearings using conventional plastic or rubber seals as shown in FIG. 18 cannot completely keep the lubricant from leaking out. The centrifugal force of the rotating outer ring 7 will force some lubricant out of the seal disk 6 through seal groove 7', although the leakage may be very small. Leakage of the lubricant increases with a rise in the operating temperature of the seal-type bearing, because the viscosity of the lubricant rapidly lowers as the operating temperature exceeds 80° C.

A seal disk 6 itself undergoes great change in the crystal structure of its resin material as it is subjected repeatedly to a heating and cooling cycle and as it absorbs moisture from the atmosphere. This results in distortion or a change in dimension of the seal disk, with increased leakage of the lubricant.

SUMMARY OF THE INVENTION

The present invention addresses problems such as those described above. It is an object of the present invention to provide a bearing seal disk that can be fixed in the seal groove of an outer ring concentrically with the bearing and have the axis thereof as its center, irrespective of the angle of inclination formed by the outer inside wall of the seal groove in the outer ring. It is another object of the present invention to provide a bearing seal disk the sealing performance of which is so enhance as to prevent lubricant from leaking out almost completely, both in high temperature operation and in and after prolonged service.

FIRST EMBODIMENT

To achieve these objects, the present invention provides a non-contact plastic or rubber seal disk for bearings, the disk having an outer peripheral portion to be pushed into a ring-shaped seal groove having a U-shaped section. The seal groove is formed inside each shoulder of the outer ring or outside the outer end of the outer ring land of the bearing and comprises an inner inside wall perpendicular to the axis of the bearing, a bottom wall, and an open-out-formed outer inside wall. The outer peripheral portion of the seal disk is in elastic contact with the inner inside wall and the outer inside wall of the ring-shaped seal groove. The seal disk is configured so as to provide a very narrow gap between the bore wall of the seal disk and the inner ring of the bearing.

The ring-shaped seal groove is provided with a protrusion on the inner inside wall thereof at the outer end of each outer ring land, that is, at each of the edges of the inside wall of the outer ring. On the back side, the seal disk is provided with a ring-shaped raised area with a trapezoid-like section that is brought into area contact with the inner inside wall of the seal groove. On the face, the seal disk has a ring-shaped thin projection, optionally having its tip formed like an arc, in its outer peripheral portion that is brought elastically into contact with the outer inside wall of the seal groove in the outer ring. A ring-shaped sealing recess if formed just inside the trapezoid-like raised area on the seal disk, the recess coming into contact with at least part of the protrusion formed on the inner inside wall of the seal groove.

The seal disk thus configured is pushed into the seal groove, and at least part of the projection in the groove is brought into contact with the sealing recess of the seal disk. In this way, the seal disk is mounted in the bearing concentrically with the bearing axis as its center, which increases sealing performance.

In addition to the structure just described, the non-contact plastic or rubber seal disk for bearings may be provide with a protrusion having a rectangular or trapezoid-like section on the inner inside wall of the seal groove at the outer edge of each outer ring land of the bearing. The sealing recess in the seal disk may be defined by a notch in the shape of a step with a rectangle-like or trapezoid-like section formed just inside the trapezoid-like raised area ring. The seal disk is pushed with the above-mentioned protrusion coming into that step.

SECOND EMBODIMENT

The present invention also provides a non-contact plastic or rubber seal disk for bearings having an outer peripheral portion to be pushed into a ring-shaped seal groove of U-shaped section and formed inside each shoulder of the outer ring or at each outer end of each outer ring land of the bearing. The seal groove comprises an inner inside wall perpendicular to the axis of the bearing, a bottom wall, and an open-out-formed outer inside wall. The outer peripheral portion of the seal disk is in elastic contact with the inner inside wall and the outer inside wall of the groove. The seal disk is configured so as to provide a very narrow gap between the bore wall of the seal disk and the inner ring of the bearing.

The ring-shaped seal groove is provided with a sealing pit on the inner inside wall thereof. The seal disk is provided with, on the back side of the outer peripheral portion thereof, a ring-shaped raised area having a trapezoid-like section that comes into area contact with the inner inside wall of the seal groove and, on the face of the outer peripheral portion of the seal disk, a ring-shaped thin projection that comes into contact, in a bent form, with the outer inside wall of the seal groove. In this embodiment, the seal disk is also provided with, on the aforesaid raised area thereof, a protuberance that comes into area contact with at least part of the pit formed on the inner inside wall of the seal groove.

The seal disk so configured is pushed into the seal groove, and at least part of the ring-shaped protrusion in the groove is brought into contact with the sealing recess of the seal disk. In this way, the seal disk is mounted in the bearing concentrically with the bearing axis as its center, and improved seal performance is achieved.

In this embodiment, the sealing pit and the sealing protuberance may be approximately rectangular, semi-circular, V-shaped, or trapezoidal in sectional shape. In any of these configurations, the sealing protuberance may be brought into close contact with the sealing pit. When the sealing protuberance is approximately rectangular, V-shaped, or trapezoidal in sectional shape, the outer side surface of the pit may connect linearly with an inclined insertion surface on the outer peripheral side of the seal disk. Further, in any of these configurations, the thin projection may be one with the tip formed in the shape of an arc.

In addition, the sealing pit $2g$ may be a recess formed in a step shape at the inside wall ($2f$) side of the outer ring $2$. In this case, leakage of grease is prevented as long as the seal disk is not shrunk due to the temperature rise.

DETAILED DESCRIPTION OF PREFERRED EMBODIMENTS

Certain preferred embodiments of the present invention will now be described in detail, with reference to the drawings.

FIRST EMBODIMENT

EXAMPLE 1

Figure 1:
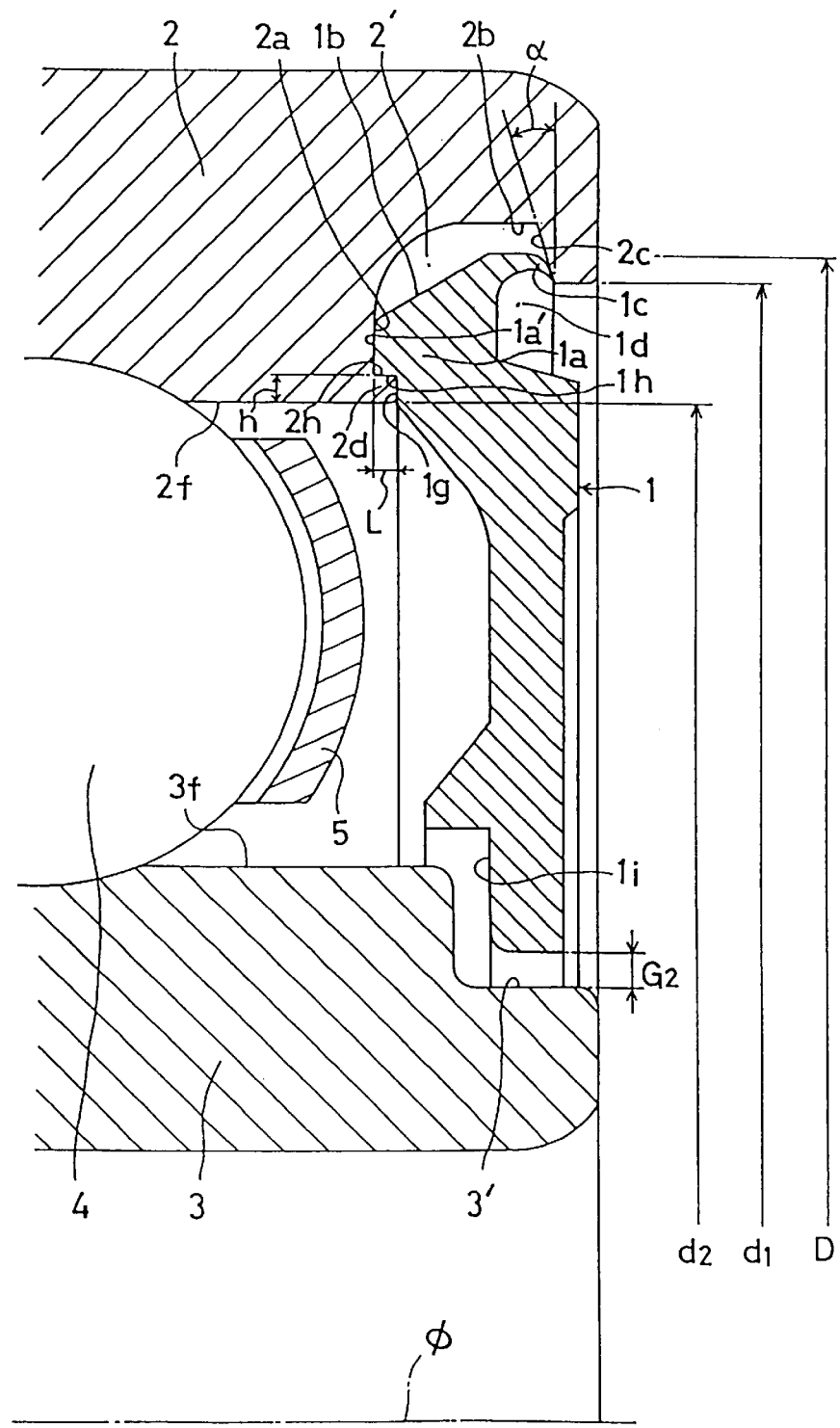
FIG. 1 is an enlarged sectional view of a part of interest of a bearing mounted with a seal disk of a first example of a first embodiment of the present invention.
Figure 2:
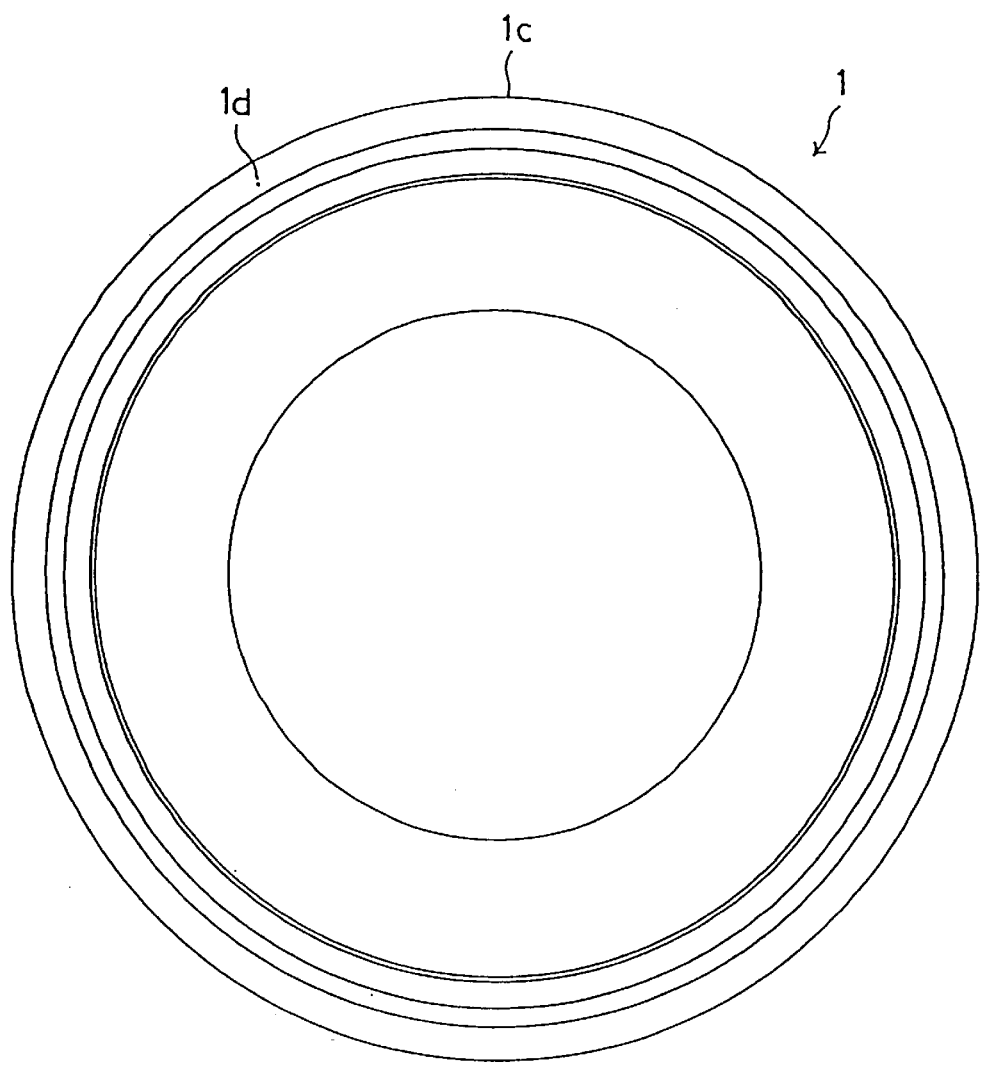
FIG. 2 is an enlarged front view of the seal disk.
Figure 3:
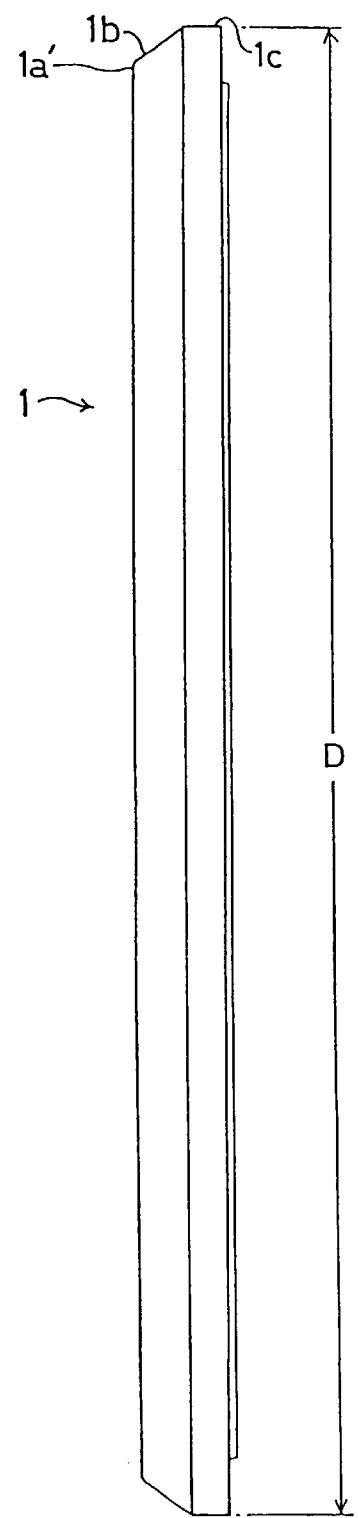
FIG. 3 is an enlarged side view of the seal disk.
Figure 4:
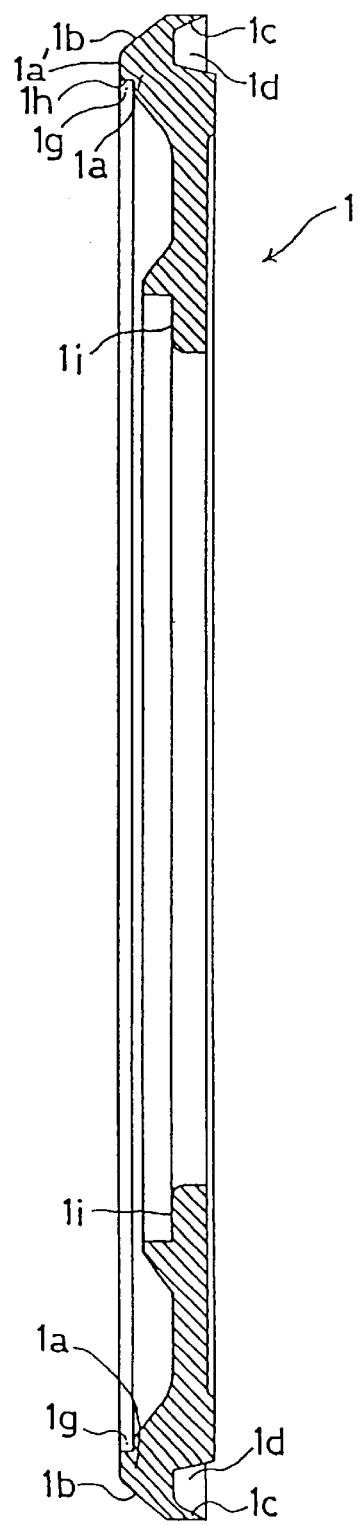
FIG. 4 is an enlarged sectional view of the seal disk.
Figure 5:
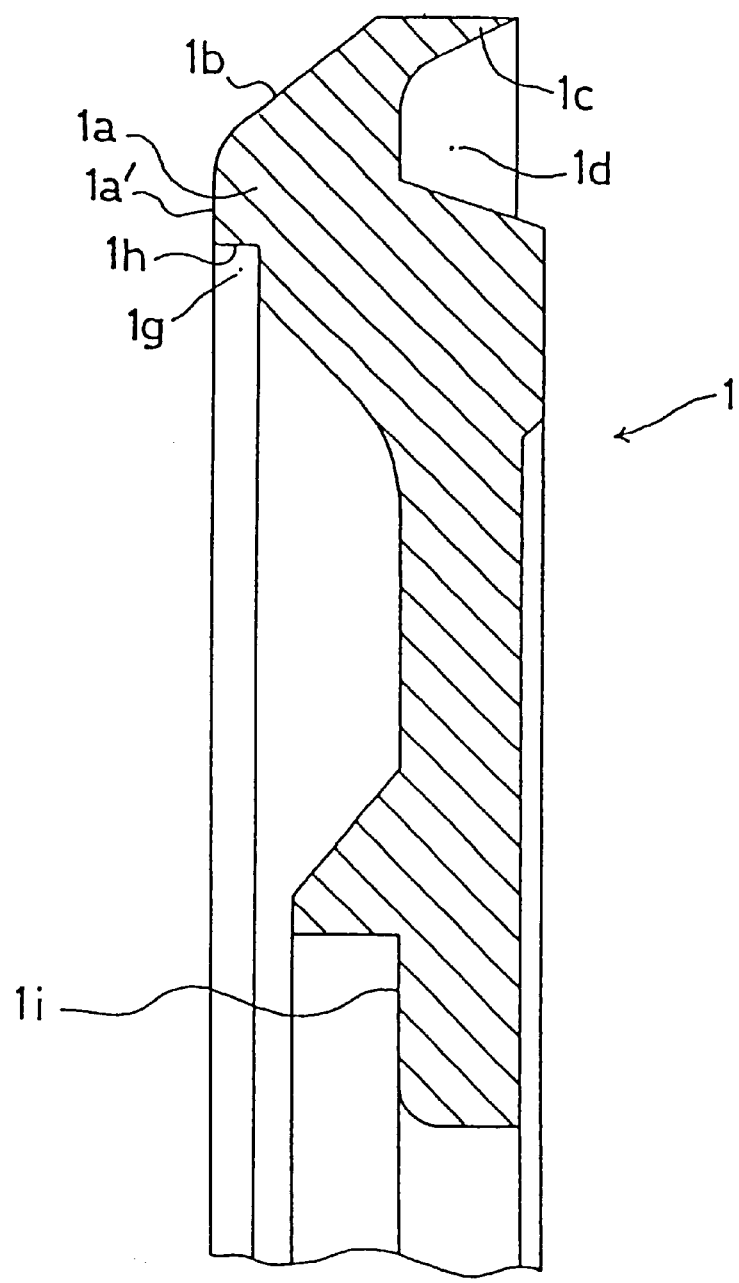
FIG. 5 is an enlarged sectional view of a part of interest of the seal disk.

FIG. 1 is a partial enlarged view of a ball-and-roller bearing mounted with a seal disk 1 of the first embodiment of the present invention. In FIG. 1, reference numeral 2 indicates an outer ring with a raceway formed in the center, numeral 3 indicates an inner ring with a raceway formed in the center, numeral 4 indicates a plurality of free-rolling balls placed between the raceways, and numeral 5 indicates a retainer or separator holding the balls at regular intervals.

A ring-shaped seal groove 2' with a U-shaped section is provide inside each of the shoulders or at the outer end of each land or the inside wall 2f of the outer ring 2. Seal groove 2' comprises an inner inside wall 2a perpendicular to the axis ø of the bearing, a bottom wall 2b connecting with inside wall 2a, and an outer inside wall 2c declined in an opening-out form and connecting with bottom wall 2b.

Figure 8:
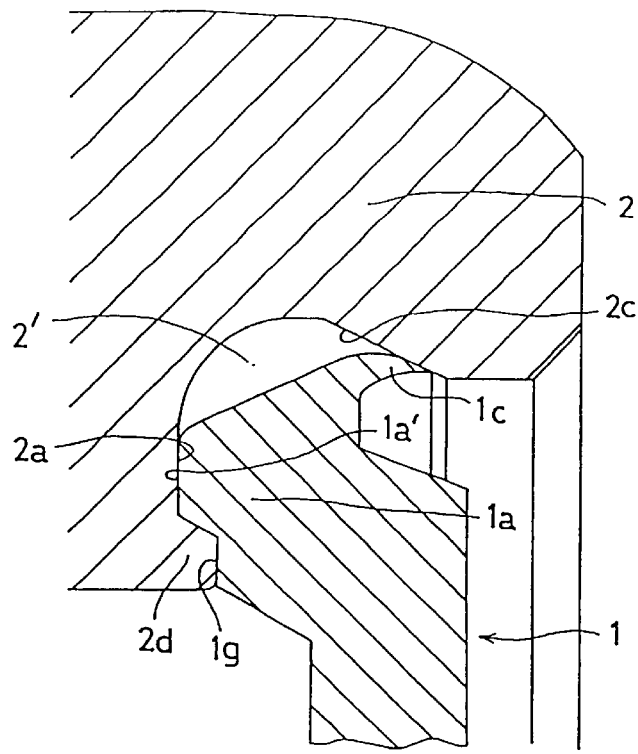
FIG. 8 is an enlarged sectional view of a part of interest of a fourth example of the first embodiment of the present invention.

A protrusion 2d with a length L and a height h is formed on the outer end of each land or the inside wall 2f of the outer ring. Length L and height h are limited by the size of the inner space of the seal-type bearing and such dimensions of the raised area 1a as the thickness of the seal disk 1. The ring-shaped protrusion 2d in FIG. 1 is rectangular in sectional shape. A protrusion 2d may be trapezoidal in sectional shape, as shown in FIG. 8.

To facilitate mounting seal disk 1 in seal groove 2', the inside diameter d1 of the face of outer ring 2 or the inside diameter d1 of the outer inside wall of groove 2' is configured a little larger than the inside diameter d2 of the land continuing with ball raceway 4 but somewhat smaller than outside diameter D of the seal disk 1.

A step 3' may optionally be provided on the outer circumferential surface 3f of inner ring 3, to define a labyrinth of a gap between the bore wall surface of seal disk 1 and the inner ring 3.

The seal disk 1 of the first embodiment of the present invention is integrally molded of an engineering plastic that has excellent thermal resistance, wear resistance, and chemical resistance, such as polyamide, polyester, or rigid nylon. In this first Example, the seal disk 1 is formed of the engineering plastic PELPRENE (Toyobo Co., Ltd., Japan). Synthetic or natural rubbers with suitably adjusted hardness can also be used instead.

The wall thickness of the seal disk is reduced on the intermediate area facing retainer 5 in order to avoid contact therewith, as shown in FIGS. 2–5. A raised area 1a with a trapezoid-like section is formed on the back side of seal disk 1 in the outer circumferential portion thereof. It comes into area contact with the inner inside wall 2a of seal groove 2'. Flat top 1a' of the raised area 1a fits the inner inside wall 2a of seal groove 2'. The outer circumferential surface of raised area 1a is inclined to the inclined insertion surface 1b to facilitate the installation of the seal disk.

A ring-shaped sealing recess 1g with a length of approximately L and with a smooth inner cylindrical wall 1h facing the axis is formed on the axis side of flat top 1a' of raised area 1a of seal disk 1 which comes into contact with inner inside wall 2a of seal groove 2'. When seal disk 1 is pushed into seal groove 2', inner cylindrical wall 1h of sealing recess 1g comes into close contact with the outer circumferential surface 2h of protrusion 2d formed on the outer end of the land or the inside wall 2f of outer ring 2.

Also, a ring-shaped projection 1c is formed on the face of seal disk 1 in the outer circumferential portion thereof. This projection comes into contact, in a bent form, with the outer inside wall of seal groove 2'. The projection 1c can be bent toward the bore of seal disk 1 without difficulty, because a ring-shaped cavity 1d with a trapezoid-like section is provided on the face of seal disk 1 just inside the outer circumferential portion thereof. Projection 1c is formed in a very thin and pointed sectional shape, and extends out on the ace of seal disk 1 along the line of the axis thereof. The outer circumferential surface of projection 1c connects with inclined insertion surface 1b and is parallel with the axis of seal disk 1.

Seal disk 1 is made thicker at the bore wall portion than at the middle part between the outer circumferential surface and the bore wall. Optionally, the seal disk may be provided with a ring-shaped step 1i on the back side in the bore portion to define a labyrinth of a gap with step 3', also optional, of inner ring 3.

The outside diameter D of seal disk 1 is made a little larger than inside diameter d1 of each face of outer ring 2, or the outer inside wall of seal groove 2'. Some room is left before the bottom 2b of seal groove 2' when the seal disk 1 is placed in the seal groove 2'. The inside diameter of seal disk 1, also, is set so as to leave some gap G2 around the outer circumferential surface of inner ring 3 when the seal disk 1 is pushed into the seal groove 2'.

In the present Example, the outside diameter D of seal disk 1 measures 15.00 mm, with projection 1c being about 0.1 mm thick at its tip. A gap G2 of 0.1 mm is created between the bore wall of seal disk 1 and step 3' of the inner ring 3 when the seal disk 1 is fixed into seal groove 2' of outer ring 2. The angle of inclination α on the outer inside wall of seal groove 2' is set at 17 degrees with the face of the outer ring 2—the face that is perpendicular to the axis of the bearing.

EXAMPLES 2A and 2B

Figure 6:
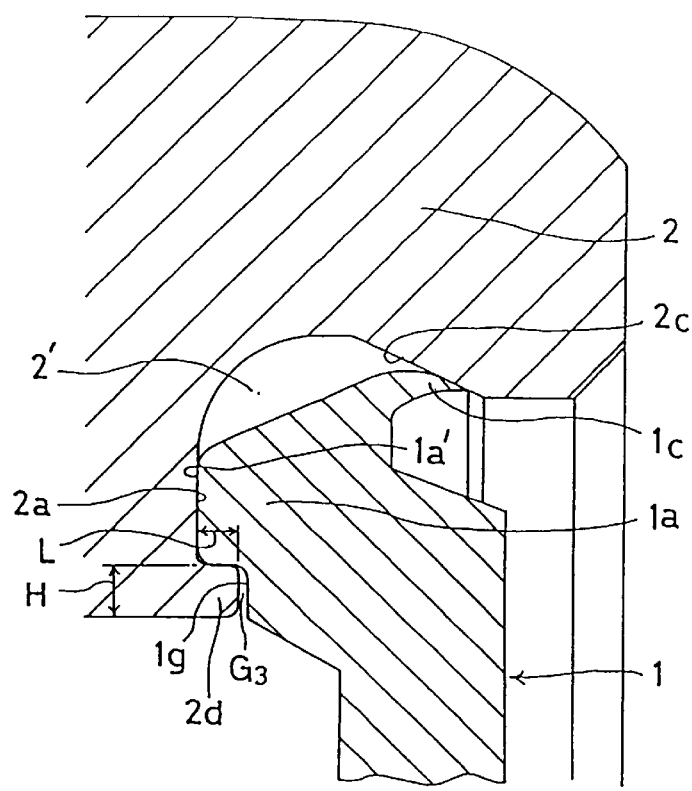
FIG. 6 is an enlarged sectional view of a part of interest of a second example of the first embodiment of the present invention.
Figure 7:
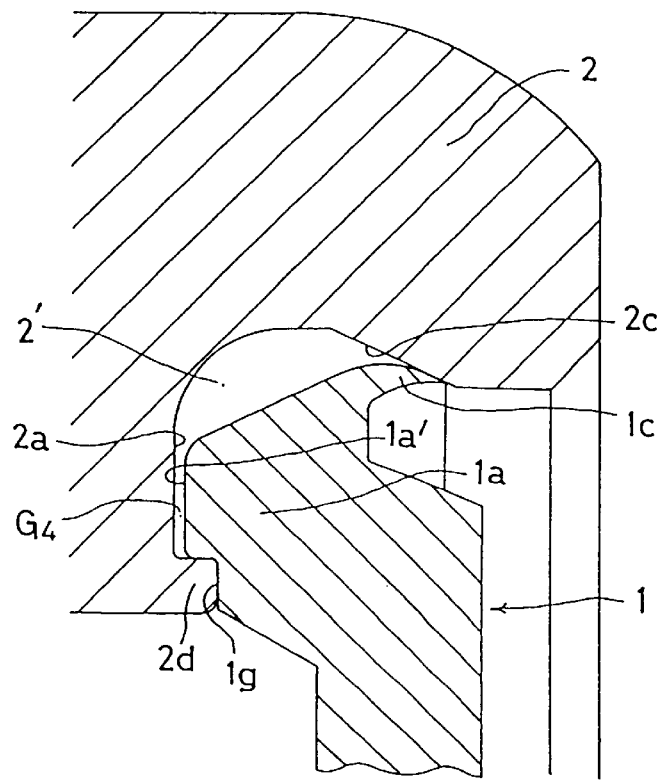
FIG. 7 is an enlarged sectional view of a part of interest of a third example of the first embodiment of the present invention.

FIGS. 6 and 7 are enlarged views of other examples of the first embodiment of the present invention. The seal disk 1 is shown placed in the seal groove 2' of the outer ring 2. In the seal disk 1 in FIG. 1, dimensions such as L and H are selected so that the flat top 1a' and the sealing recess 1g of the seal disk 1 come into full contact with the inner inside wall 2a of the seal groove 2' and the protrusion 2d provided thereon. The examples shown n FIGS. 6 and 7 set the dimensions such as L and H so that the seal disk 1 leaves a gap G3 (FIG. 6) or a gap G4 (FIG. 7) when the seal disk 1 is put in place.

EXAMPLES 3 and 3bis

Figure 9:
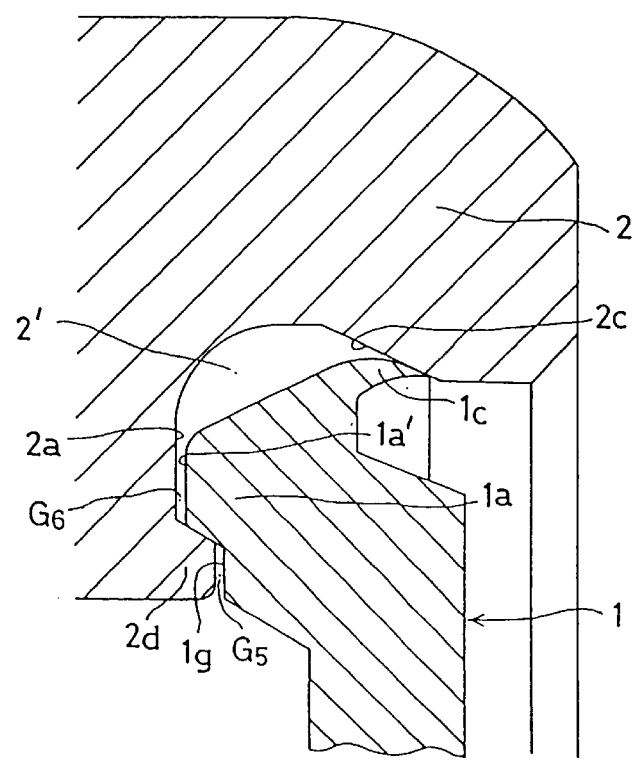
FIG. 9 is an enlarged sectional view of a part of interest of a fifth example of the first embodiment of the present invention.

FIG. 8 shows still another example of the first embodiment of the present invention. Its seal disk 1 is shown mounted in an enlarged sectional view. In this example, the protrusion 2d and the sealing recess 1g are shaped with a trapezoid-like section. In FIG. 8 as in FIG. 1, the flat top 1a' and the sealing recess 1g of the seal disk 1 come into full contact with the inner inside wall 2a of the seal groove 2' and protrusion 2d thereon. It may be configured so as to leave a gap G3' or G4' (not shown) as in FIGS. 6 and 7, or both a gap G5 and a gap G6 as shown in FIG. 9.

EXAMPLE 3ter

Figure 10:
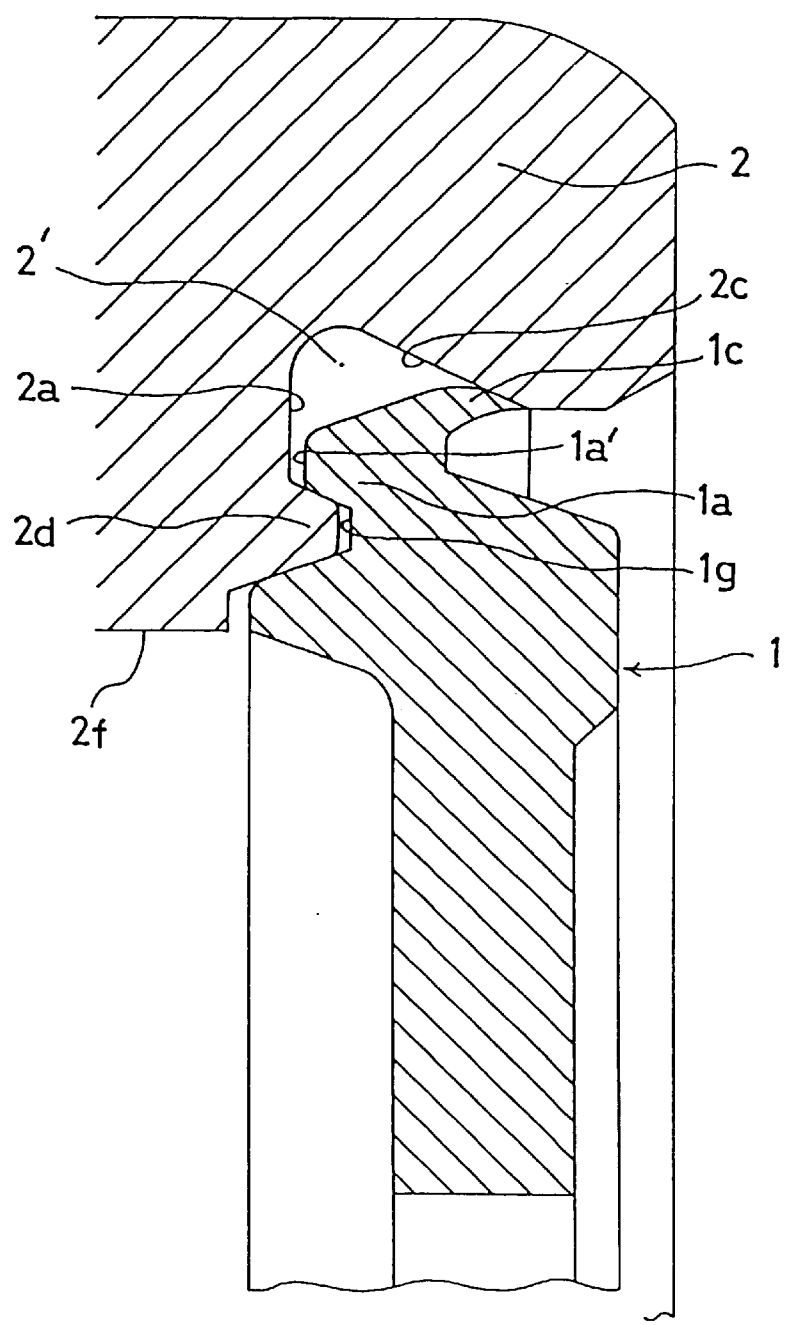
FIG. 10 is an enlarged sectional view of a part of interest of a sixth example of the first embodiment of the present invention.

In FIGS. 1–9, the protrusion 2d and the sealing recess 1g are formed on a level with the outer end of the land or the inside wall 2f of the outer ring 2. The position of protrusion 2d and sealing recess 1g may be shifted to the middle of the inner inside wall of the seal groove 2' away from the level of land or inside wall 2f of outer ring 2, as shown in FIG. 10.

EXAMPLE 3quater

Figure 15:
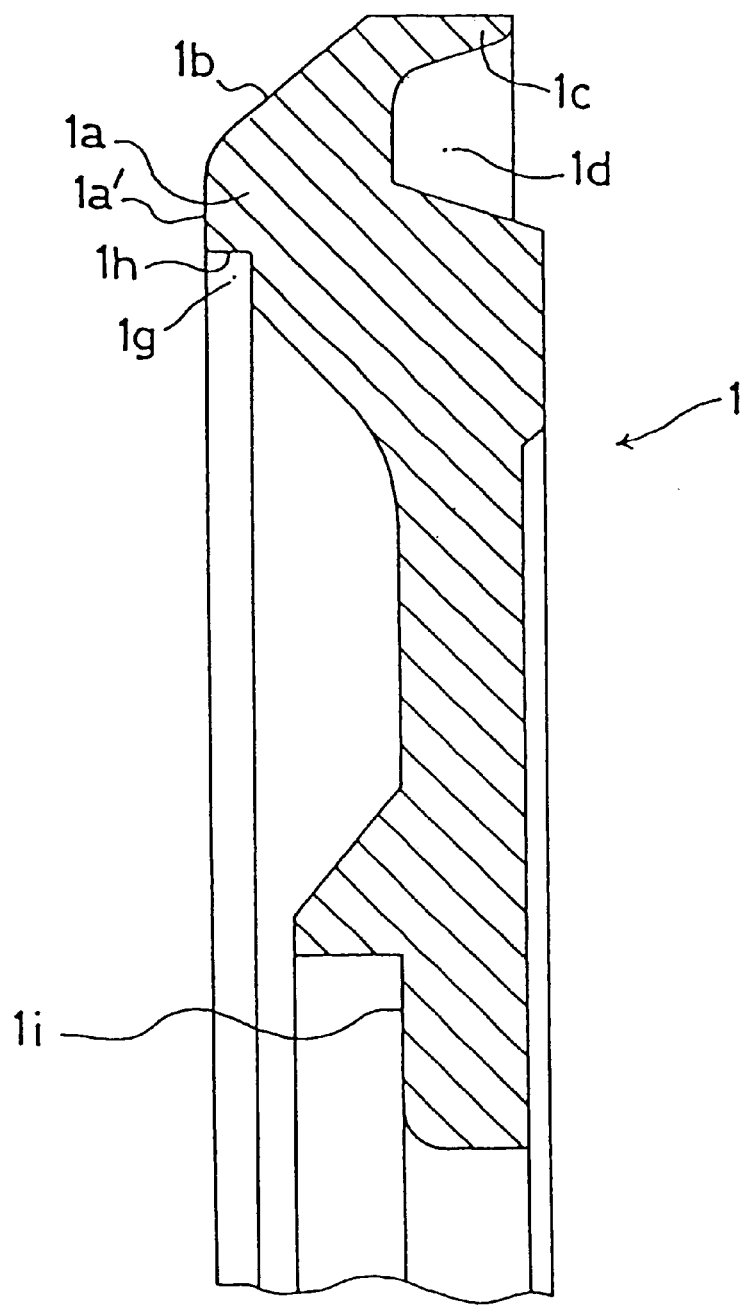
FIG. 15 is an enlarged sectional view of a part of interest of a seventh example of the first embodiment of the present invention.

In the foregoing examples, the projection 1c is so formed as to be pointed and very thin in sectional shape. The sectional shape of seal disk 1 is not limited to that configuration, however. Instead, the tip of projection 1c may be arc-shaped and rather rounded, as illustrated in FIG. 15.

SECOND EMBODIMENT

EXAMPLES 4, 4bis, and 4ter

Figure 11:
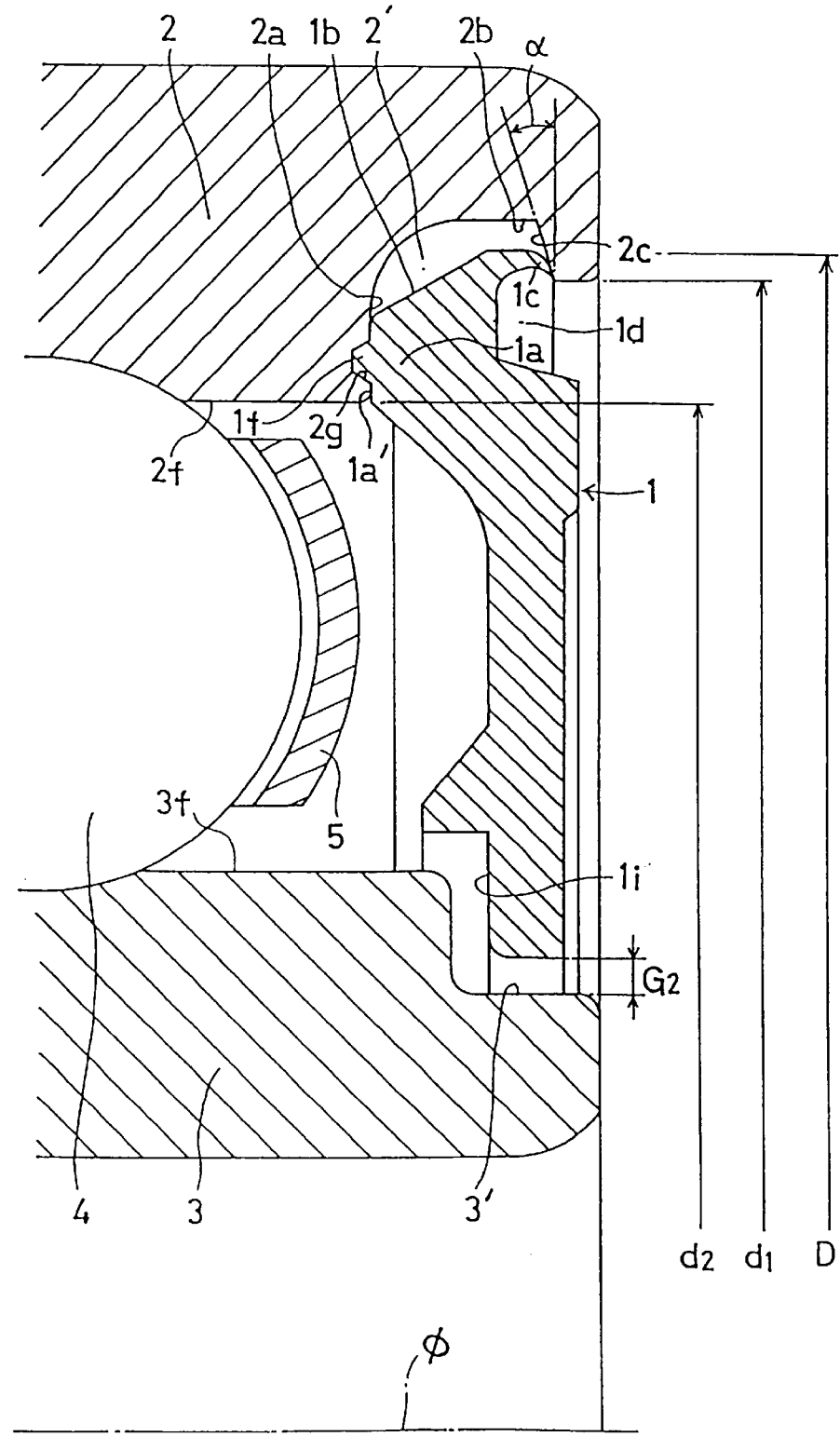
FIG. 11 is an enlarged sectional view of a part of interest of a bearing mounted with a seal disk of a first example of a second embodiment of the present invention.

FIG. 11 is an enlarged view of a bearing mounted with a seal disk 1 of the second embodiment of the present invention. In FIG. 11, reference numeral 2g indicates a sealing pit, while 1f indicates a sealing protuberance. Other parts are referenced by the numerals used in FIGS. 1 to 9. In the second embodiment, a ring-shaped sealing pit 2g is formed approximately in the middle of the inner inside wall of the seal groove 2' of outer ring 2. A ring-shaped sealing protuberance 1f is formed in the middle of the flat top 1a' on the trapezoid-like raised area 1a of the seal disk 1. The sealing protuberance mates with the aforesaid sealing pit 2g.

Figure 12:
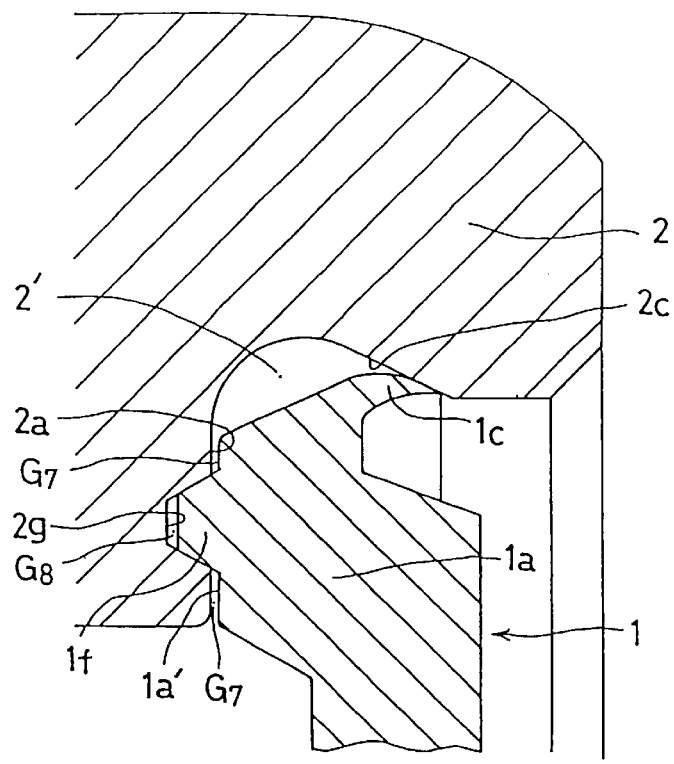
FIG. 12 is an enlarged sectional view of a part of interest of a second example of the second embodiment of the present invention.
Figure 13:
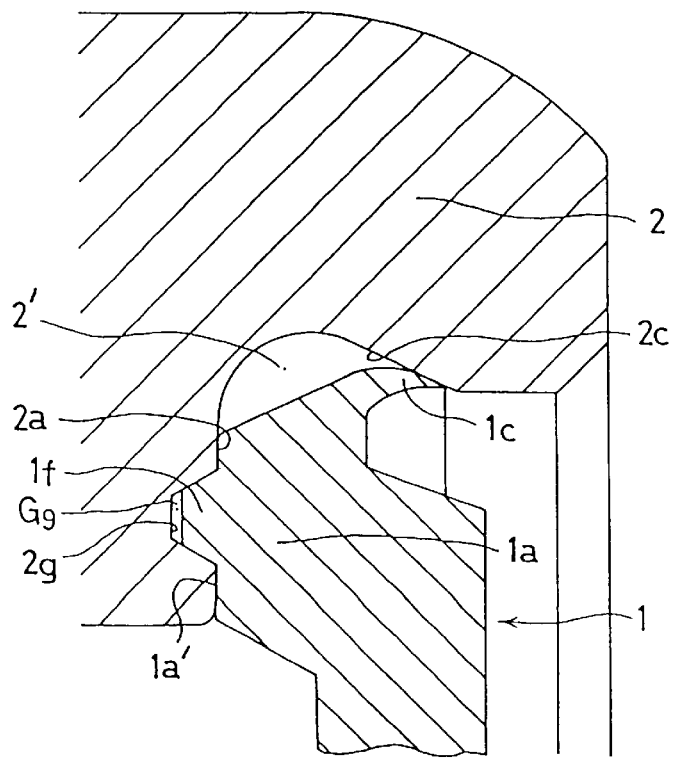
FIG. 13 is an enlarged sectional view of a part of interest of a third example of the second embodiment of the present invention.

In FIG. 11, the pit 2g and the sealing protuberance 1f are approximately trapezoidal in section. However, the sectional shape may be rectangular, semi-circular, V-shaped, or the like. Dimensions including the width and height of pit 2g and protuberance 1f are selected so that those two parts come fully into close contact with one another when seal disk 1 is placed in seal groove 2'. However, the width and height of parts 2g and if may be set so as to create a gap G7 and/or a gap G9, as illustrated in FIG. 12 and FIG. 13.

EXAMPLE 5

Figure 14:
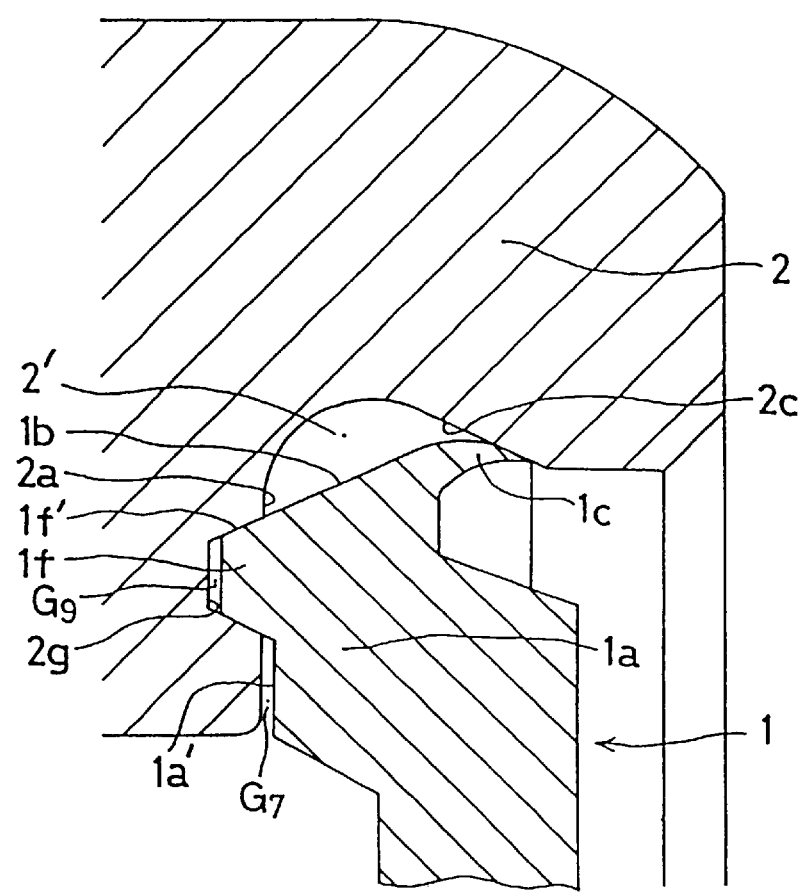
FIG. 14 is an enlarged sectional view of a part of interest of a fourth example of the second embodiment of the present invention.

FIG. 14 shows another example of the second embodiment of the present invention shown in FIG. 11. In this example, the sealing protuberance 1f is formed on the extreme end of the flat top 1a' of raised area 1a, with the outer circumferential surface thereof linearly connecting with the inclined insertion surface 1b of raised area 1a. In FIG. 14, sealing protuberance if is trapezoidal in section. The sectional shape is not limited to trapezoidal. Instead, it may be, for instance, square or V-shaped. Also, the dimensions may be selected so as not to create gap G7 and/or G9.

The example of the second embodiment shown in FIG. 14 offers advantages in that the seal disk, especially the sealing protuberance if on the seal disk 1, is easy to mold, which significantly simplifies the contour of the molding die.

EXAMPLE 5bis

Figure 16:
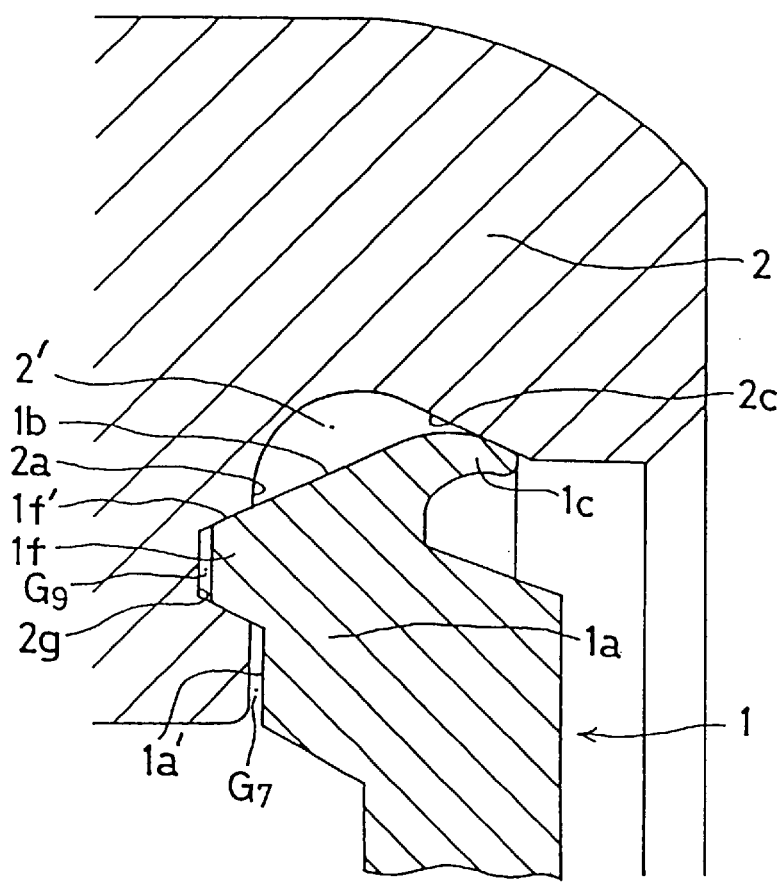
FIG. 16 is an enlarged sectional view of a part of interest of a fifth example of the second embodiment of the present invention.

In the foregoing examples, the projection 1c is so formed as to be pointed and very thin in sectional shape. The sectional shape of seal disk 1 is not limited to that configuration, however. Instead, the tip of projection 1c may be arc-shaped and rather rounded, as illustrated in FIG. 16.

EXAMPLES 6 and 7

Figure 17:
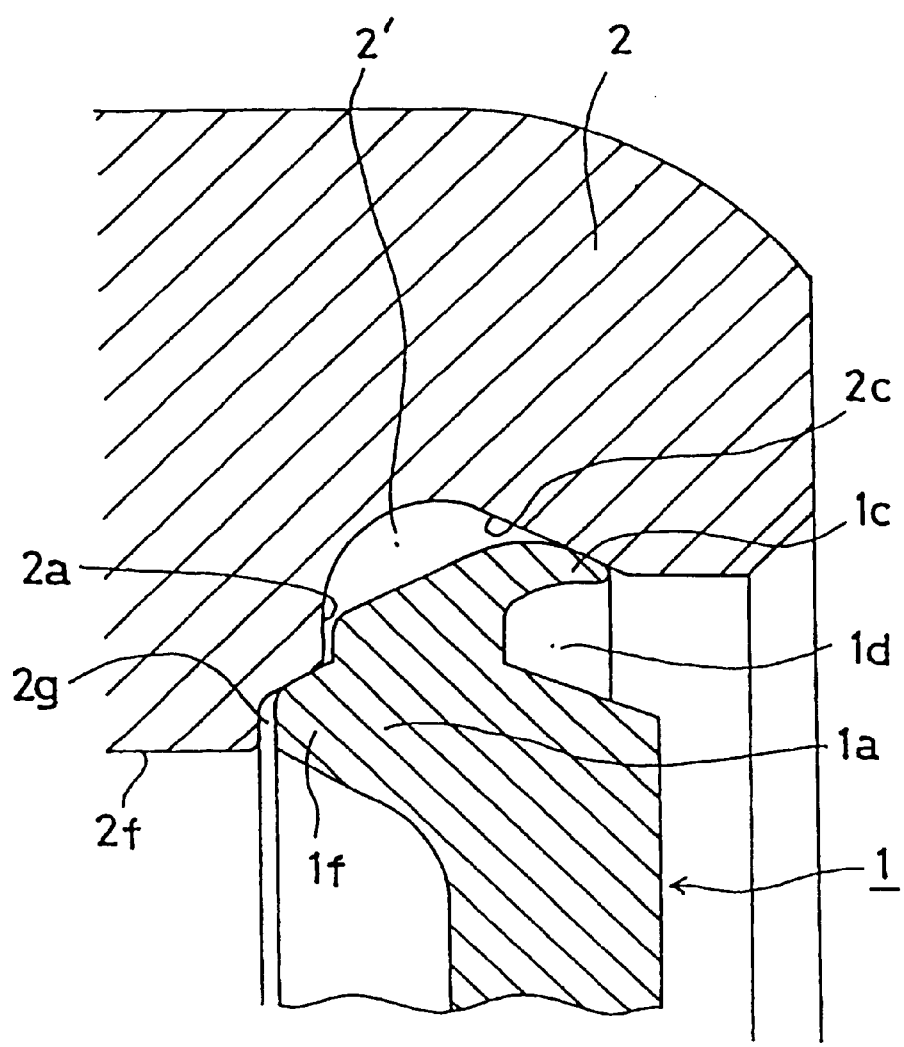
FIG. 17 is an enlarged sectional view of a part of interest of a sixth example of the second embodiment of the present invention.
Figure 18:
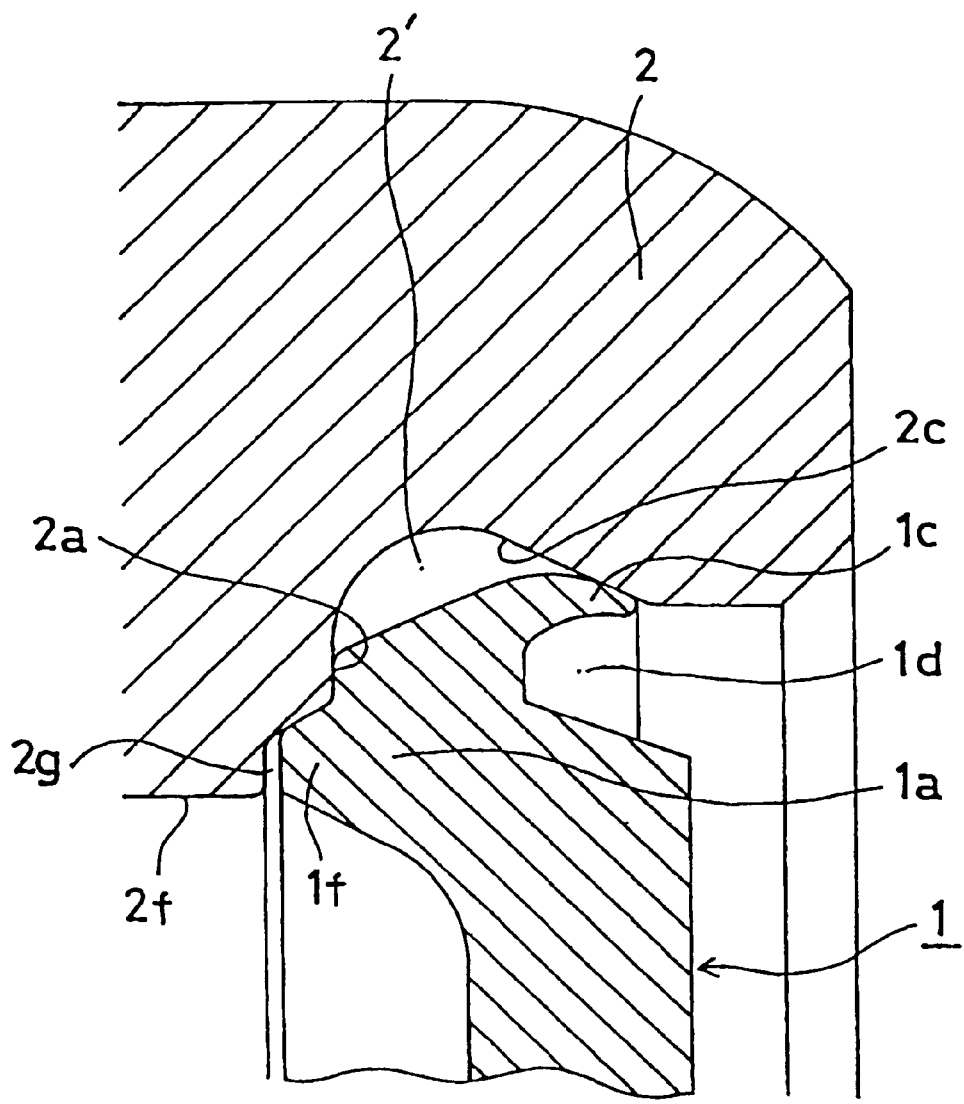
FIG. 18 is an enlarged sectional view of a part of interest of a seventh example of the second embodiment of the present invention.
Figure 19:
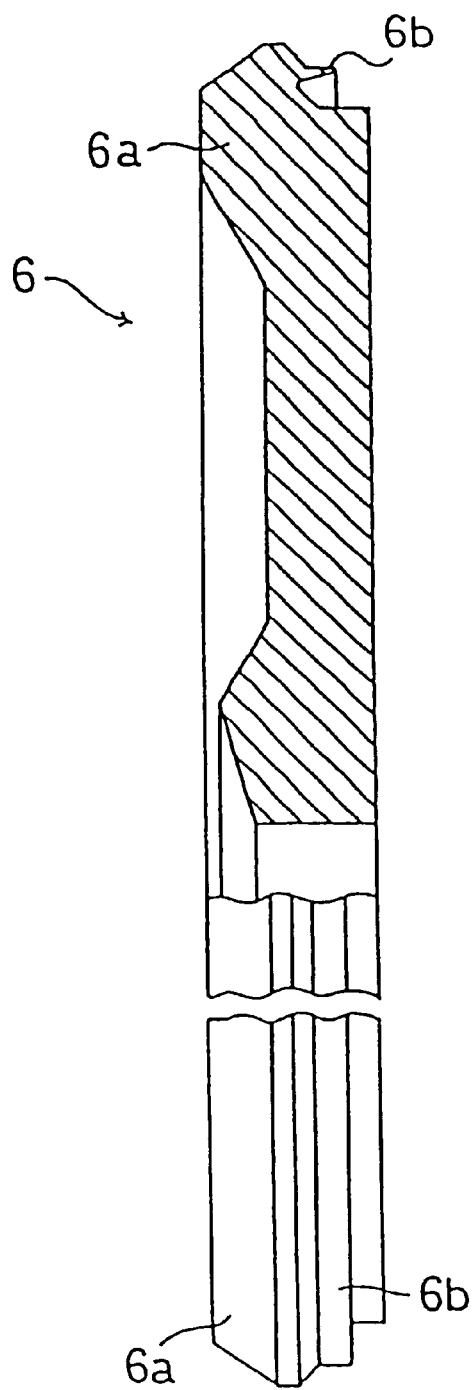
FIG. 19 is an enlarged sectional view of a partial cutaway of a prior art bearing seal disk.
Figure 20:
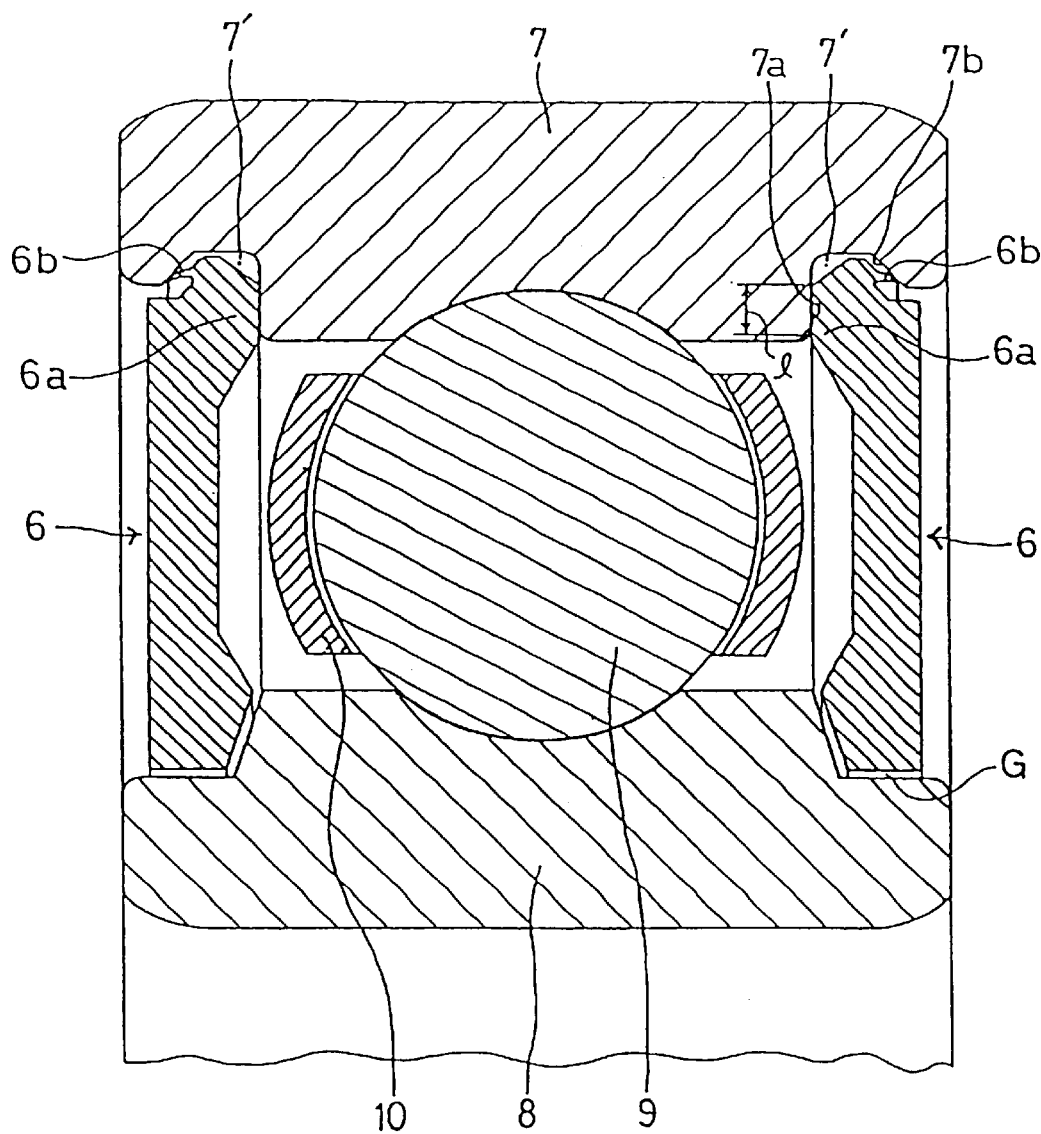
FIG. 20 is an enlarged sectional view of a part of a bearing mounted with a prior art seal disk.
Figure 21:
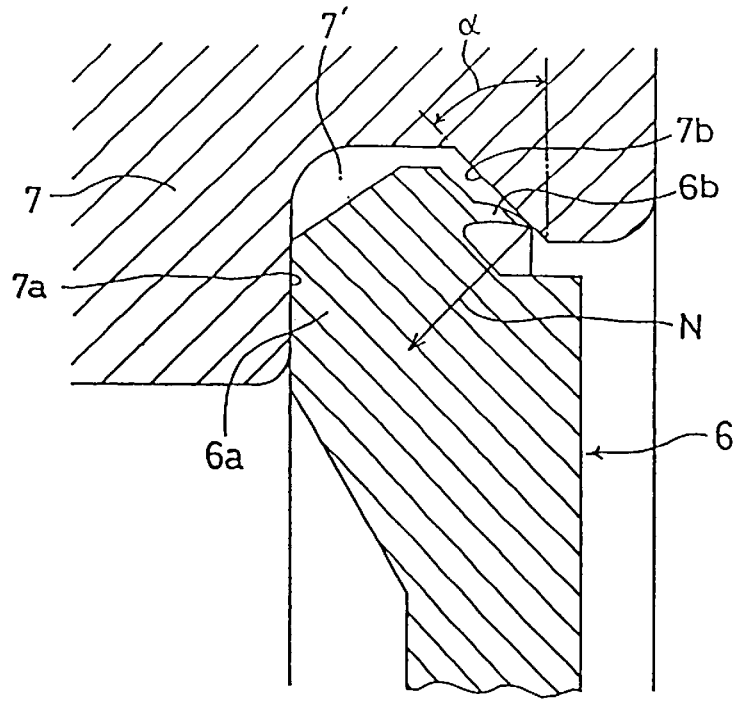
FIG. 21 is an enlarged sectional view of a part of interest of a prior art seal disk installed in an outer ring with a large angle of inclination formed by the outer inside wall of the seal groove.
Figure 22:
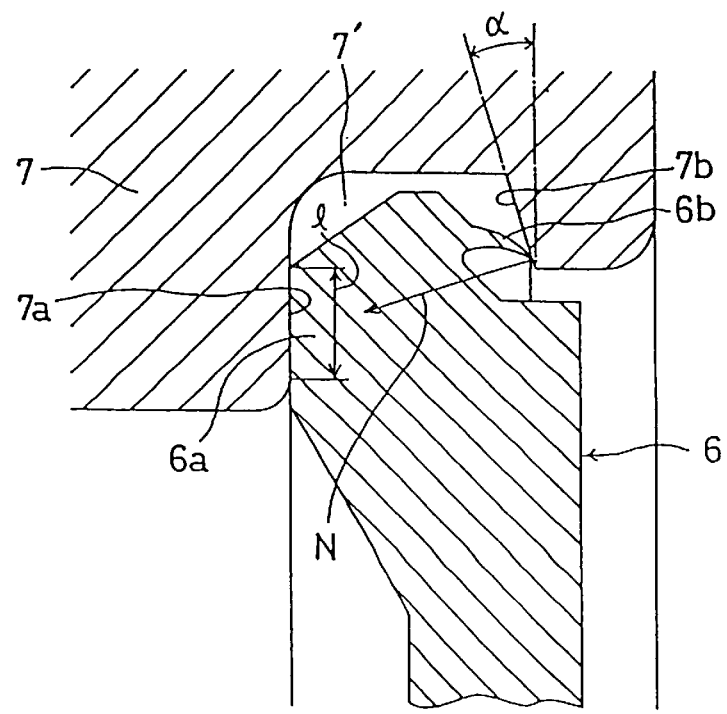
FIG. 22 is an enlarged sectional view of a part of interest of a prior art seal disk installed in an outer ring with a small angle of inclination formed by the outer inside wall of the seal groove.

FIGS. 17 and 18 illustrate Examples 6 and 7, respectively. In these examples, the sealing pit 2g is a recess formed at the inside wall (2f) side of the outer ring 2 and configured in a step shape.

MOUNTING THE SEAL DISK

In mounting a seal disk of the first embodiment in a bearing, the seal disk is first placed on the bearing face with the inclined insertion surface of the seal disk 1 on the inside corner of the face of the outer ring 2. The seal disk is then pressed inward uniformly around the periphery on the face of the seal disk. Seal disk 1 bends evenly because it is elastic. The circumferential edge thereof slips into seal groove 2' of outer ring 2.

When seal disk 1 is placed in seal groove 2', the flat top 1a' of raised area 1a of the seal disk 1 comes into area contact with the inner inside wall 2a of the seal groove 2', with sealing recess 1g receiving the protrusion 2d provided on the outer end of land or inside wall 2f of outer ring 2, as shown in FIG. 1. At the same time, projection 1c comes into bent contact with the outer inside wall 2c of seal groove 2'. The elastic force of projection 1c pushes the trapezoid-shaped raised area 1a of seal disk 1 into seal groove 2' firmly and closely.

In bearings with a small angle of inclination α formed by the outer inside wall of seal groove 2', the elastic reaction force generated by the bent projection 1c works rather in the direction parallel to the axis ø of the bearing. This means that the component of force working from the outer circumferential portion of seal disk 1, that is, the component force in the direction perpendicular to the axis ø, is small, and a conventional seal disk could be mounted eccentrically in seal groove 2' of outer ring 2, depending on the way the seal disk is installed.

A seal disk 1 according to the present invention is provided with a sealing recess 1g into which the protrusion 2d of the outer ring 2 fits as mentioned. Even if this seal disk slips eccentrically into the seal groove 2' during the installation step, the sealing recess 1g will position the seal disk 1 concentrically with the bearing, with the axis as center. Thus, a seal disk 1 will not be eccentrically mounted in a seal groove 2', even if the angle of inclination α of the outer inside wall 2c of the seal groove 2' is small.

Additionally, there will be no non-uniformity in the gap G between the bore wall of seal disk 1 and the inner ring 3. That in turn keeps the seal disk from decreasing in sealing performance with time of service, holds the seal disk secure in the seal groove, and maintains the roundness of the outer ring 2.

It is also noted that the inner cylindrical wall surface of sealing recess 1g and outer circumferential surface of the protrusion 2d come into close contact with one another, further enhancing the sealing performance of seal disk 1. This is particularly advantageous to sealing performance when the seal disk shrinks at high temperatures.

Since the aforesaid seal disk 1 has a projection 1c with the tip formed very thin, the outer circumferential portion thereof bends readily and does not put up much resistance when the seal disk is slipped into the seal groove. Thus the seal disk can be place into the seal grove easily and smoothly.

Another point to be noted is that the trapezoid-like raised area 1a limits the thrusting in the seal groove 2' of the seal disk 1. Therefore, even if an excessive thrusting force is applied to the seal disk, there is no possibility of the seal disk being partially smashed, damaged, or distorted.

A seal disk 1 of the invention is placed in seal groove 2' with the projection 1c bent against and in elastic contact with the outer inside wall 2c of the seal groove 2', with the raised area 1a in elastic area contact with the inner inside wall 2a of the seal groove 2', and with the projection 2d making area contact with the sealing recess 1g. In addition, a labyrinth of a gap G2 is formed between the bore wall of the seal disk 1 and the inner ring 3. Thus the sealing performance of the seal disk is substantially enhanced.

In the seal disk 1 of the invention, furthermore, no significant radial force will work against the outer ring 2, because the outer circumferential portion of the seal disk engages with the outer ring only on the inner inside wall 2a and the outer inside wall 2c of the seal groove 2'. For this reason the seal disk mounted in the seal groove will not affect the roundness of the outer ring.

Still another point to note is that little force will work to thrust the seal disk 1 out of the seal groove 2', because the projection 1c extends out in the direction of the face of the outer ring 2 and thrusts against the outer inside wall of the seal groove 2'. As a result, even when the bearing is used under vigorous conditions of high humidity and high temperature and the seal disk expands after being subjected to such conditions, the seal disk will not bulge outward but will stay correctly mounted and in good condition.

VARIATIONS

The foregoing examples have the projection 1c formed in the direction approximately parallel to the axis of the seal disk 1. The direction of projection 1c, however, is not limited to that. The projection may be declined inward or outward from the line of the axis of the seal disk.

In the examples given above, the seal disk 1 is formed thin in the bore wall portion, with a step 1I provided on the back side of that portion. However, the bore wall portion of the seal disk 1 may be formed thick with the provision of the step dropped. Or the bore wall portion of the seal disk 1 may be formed in the same thickness as the middle part between the outer circumferential surface and the bore wall.

The seal disk 1 of the second embodiment of the present invention, as shown in FIGS. 11–14, is configured so that the provision of the sealing pit 2g and the sealing protuberance 1f increases the contact area between the seal disk and the outer ring, and forms the possible leakage path in a shape of two steps, to increase the flowing resistance, as illustrated in FIGS. 11–14, thereby effectively preventing lubricant from leaking out. Even if the seal disk 1 of the second embodiment of the present invention shrinks at a high temperature or expands as the seal disk absorbs moisture or the like, the sealing function is kept effective by either of the two contact areas between the sealing pit 2g and the sealing protuberance 1f. That precludes almost perfectly the possibility of the lubricant leaking out.

The seal disk 1 of the second embodiment of the present invention as shown in FIGS. 11–14 is constituted so as to form the sealing pit 2g on the inner inside wall 2a of the seal groove 2' of the outer ring 2. A sealing protuberance If provided on the seal disk 1 is brought into that pit 2g. However, pit 2g is optional, and the sealing protuberance 1f may be brought directly onto the land or the inside wall 2f of the outer ring 2, so that the outer circumferential surface of the sealing protuberance 1f may come into contact with the land or inside wall of the outer ring.

EFFECTS OF THE INVENTION

The present invention provides a seal disk 1 wherein a ring-shaped sealing protrusion 2d is formed on an inner inside wall 2a of a seal groove 2' of an outer ring 2, and wherein a ring-shaped sealing recess 1g is provided on the axis side of a raised area 1a of the seal disk. The sealing protrusion on an outer edge of a land or an inside wall 2f of the outer ring is brought tightly into the sealing recess when the seal disk is installed. This precludes the possibility of the seal disk being mounted eccentrically to the bearing with the axis ø as center, because when the seal disk slips into the seal groove 2' the protrusion on the outer edge of the land or the inside wall of the outer ring settles into the sealing recess, thereby restricting the mounting position of the seal disk in the radial direction.

This effect also arises in the case where the seal disk 1 is formed with the tip having an arc and slightly thick sectional shape, as shown in FIG. 15. The seal disk is mounted in the bearing in the correct position in the direction perpendicular to the axis ø.

It is also to be noted that the protrusion on the inside wall of the outer ring is brought closely into the sealing recess 1g, and that increases the airtight contact area between the seal disk and the outer ring, and hence the sealing performance of the assembly. That in turn effectively prevents the enclosed lubricant from leaking out through the seal groove when the bearing is subjected to high temperature service.

The present invention also provides a seal disk 1 wherein a ring-shaped sealing pit 2g is formed on the inner inside wall 2a of the seal groove 2' and a ring-shaped sealing protuberance 1f is formed on the flat top 1a' of the raised area 1a of the seal disk 1. The protuberance 1f is brought tightly into the sealing pit when the seal disk is installed. This precludes the possibility of the seal disk being mounted eccentrically to the bearing with the axis ø as center, because when the seal disk is mounted, the mounting position of the seal disk is restricted in the radial direction. Even if the seal disk shrinks at high temperature or expands as the seal disk absorbs moisture or the like, the sealing function is kept at a high level, which almost perfectly precludes the possibility of lubricant leaking out.

The sealing protuberance 1f on the seal disk 1 engages with the sealing pit 2g, which holds the sealing protuberance fast so as not to permit its dislocation. Even if, therefore, a projection 1c is shaped like an arc with a relatively thick tip to produce a larger elastic reaction force, there will be no possibility of the seal disk leaning one-sidedly toward the axis ø of the bearing when the seal disk is mounted. The seal disk is always mounted in the bearing in the correct position in the direction perpendicular to the axis, with improved sealing function and effectiveness in preventing the leakage of lubricant.

What is claimed is:

1. A non-contact plastic or rubber seal disk for a bearing, providing improved sealing performance, said seal disk comprising an outer peripheral portion to be captured in a ring-shaped seal groove of U-shaped section formed inside each shoulder of an outer ring of a bearing and comprising an inner inside wall perpendicular to the axis of the bearing, a bottom wall, and an open-out-formed outer inside wall, with said peripheral portion in elastic contact with said inner inside wall and said outer inside wall of the groove, and said seal disk being configured so as to provide a very narrow gap between a bore wall of the seal disk and an inner ring of the bearing, wherein said groove is provided with a ring-shaped protrusion on the inner inside wall of the seal groove at anouter edge of a land of the outer ring, wherein said seal disk is provided with:

on the back side of said peripheral portion thereof, a ring-shaped raised area of trapezoid-like section that can be brought into area contact with the inner inside wall of the seal groove;

on the face of said peripheral portion thereof, a ring-shaped thin projection that is brought into elastic contact with the outer inside wall of said seal groove; and a ring-shaped sealing recess formed just inside said trapezoid-like raised area on the seal disk, the recess coming into contact with at least part of the ring-shaped protrusion formed on the inner inside wall of the seal groove, and wherein the seal disk thus configured is pushed into the seal groove, and at least part of the ring-shaped protrusion in said seal groove is brought into contact with the sealing recess of said seal disk, whereby the seal disk is mounted in the bearing concentrically with the bearing axis as center.

2. The seal disk for the bearing of claim 1, wherein the outer ring is provided, at an outer edge of said land of the outer ring, with a protrusion of approximately rectangular or trapezoidal section and wherein a notched step of approximately rectangular or trapezoidal section is formed just inside the trapezoid-like raised area ring.

3. The seal disk for a bearing of claim 1 or claim 2, wherein the ring-shaped thin projection of the seal disk is a thin projection with the tip formed like an arc.

4. A non-contact plastic or rubber seal disk for a bearing, providing improved sealing performance, said seal disk comprising an outer peripheral portion to be captured in a ring-shaped seal groove of U-shaped section formed inside each shoulder of an outer ring of the bearing and comprising an inner inside wall perpendicular to the axis of the bearing, a bottom wall, and an open-out-formed outer inside wall, with said peripheral portion in elastic contact with said inner inside wall and said outer inside wall of the groove, and said seal disk being configured so as to provide a very narrow gap between a bore wall of the seal disk and an inner ring of the bearing, wherein said groove is provided with a ring-shaped sealing pit on the inner inside wall thereof, wherein said seal disk is provided with:

on the back side of said peripheral portion thereof, a ring-shaped raised area of trapezoid-like section that can be brought into area contact with the inner inside wall of the seal groove;

on the face of said peripheral portion thereof, a ring-shaped thin projection that comes into contact, in a bent form, with the outer inside wall of said seal groove; and, on said raised area, a ring-shaped sealing protuberance facing inward, which comes into area contact with at least part of said ring-shaped sealing pit provided on the inner inside wall of the seal groove, and wherein the seal disk thus configured is pushed into the seal groove, and at least part of the sealing protuberance is brought into contact with the inside wall of the ring-shaped sealing pit on the groove, whereby the seal disk is mounted in the bearing concentrically with the bearing axis as center.

5. The seal disk for a bearing of claim 4, wherein said ring-shaped sealing pit and sealing protuberance are of approximately rectangular, semi-circular, V-shaped, or trapezoidal section, so that said sealing protuberance may fit into said ring-shaped sealing pit.

6. The seal disk for a bearing of claim 4, wherein said ring-shaped sealing pit is a recess formed in a step shape at the inside wall side of the outer ring.

7. The seal disk for a bearing of claim 4 or claim 5, wherein said sealing protuberance is of approximately rectangular, semi-circular, V-shaped, or trapezoidal section, with the outside surface continuing linearly with an inclined surface of said raised area.

8. The seal disk for a bearing of claim 4, claim 5, or claim 6, wherein the ring-shaped thin projection of the seal disk is a thin projection with the tip formed like an arc.

9. The seal disk for a bearing of claim 7, wherein the ring-shaped thin projection of the seal disk is a thin projection with the tip formed like an arc.

* * * * *